US008712165B2

(12) United States Patent
Mita

(10) Patent No.: US 8,712,165 B2
(45) Date of Patent: Apr. 29, 2014

(54) IMAGE PROCESSING APPARATUS AND IMAGE PROCESSING METHOD

(75) Inventor: Mieko Mita, Hino (JP)

(73) Assignee: Konica Minolta Business Technologies, Inc., Tokyo (JP)

(*) Notice: Subject to any disclaimer, the term of this patent is extended or adjusted under 35 U.S.C. 154(b) by 396 days.

(21) Appl. No.: 13/183,859

(22) Filed: Jul. 15, 2011

(65) Prior Publication Data
US 2012/0020569 A1 Jan. 26, 2012

(30) Foreign Application Priority Data

Jul. 23, 2010 (JP) ................................. 2010-165714

(51) Int. Cl.
*G06K 9/48* (2006.01)
(52) U.S. Cl.
USPC ............................. 382/199; 382/232; 358/2.1
(58) Field of Classification Search
USPC .................................... 382/199, 232; 358/2.1
See application file for complete search history.

(56) References Cited

U.S. PATENT DOCUMENTS

| 4,654,721 | A  | * | 3/1987 | Goertzel et al. | 358/3.04 |
| 6,201,612 | B1 | * | 3/2001 | Matsushiro et al. | 358/1.9 |
| 7,221,483 | B2 | * | 5/2007 | Yagishita et al. | 358/3.13 |
| 7,580,074 | B2 | * | 8/2009 | Kuo et al. | 348/333.01 |

FOREIGN PATENT DOCUMENTS

| JP | 2002-252764 | 9/2002 |
| JP | 2002-262089 | 9/2002 |

* cited by examiner

*Primary Examiner* — Chan Park
*Assistant Examiner* — Eueng-Nan Yeh
(74) *Attorney, Agent, or Firm* — Finnegan, Henderson, Farabow, Garrett & Dunner, L.L.P.

(57) ABSTRACT

A pixel output order pattern selecting section selects the first pixel output order pattern set by the pixel output order pattern setting section when the edge detecting section detects the edge portion in the pixel block, and selects any of the plurality of second pixel output order patterns stored in the pixel output order pattern storage section when the edge detecting section does not detect the edge portion in the pixel block. An image data generating section generates the image data of the pixel block in order that the dots may be output in conformity with the pixel output order pattern selected by the pixel output order pattern selecting section based on the gradation value obtained by the gradation converting section.

6 Claims, 12 Drawing Sheets

INPUT PIXEL BLOCK

BLACK PIXEL OUTPUTTING ORDER
(FIRST BLOCK DITHER)

FIG.3

| 0 | 1 |
|---|---|
| 2 | 3 |

| 0 | 1 |
|---|---|
| 3 | 2 |

| 0 | 2 |
|---|---|
| 1 | 3 |

| 0 | 3 |
|---|---|
| 1 | 2 |

| 0 | 3 |
|---|---|
| 2 | 1 |

| 0 | 2 |
|---|---|
| 3 | 1 |

| 1 | 0 |
|---|---|
| 2 | 3 |

| 1 | 0 |
|---|---|
| 3 | 2 |

| 2 | 0 |
|---|---|
| 1 | 3 |

| 3 | 0 |
|---|---|
| 1 | 2 |

| 3 | 0 |
|---|---|
| 2 | 1 |

| 2 | 0 |
|---|---|
| 3 | 1 |

| 1 | 2 |
|---|---|
| 0 | 3 |

| 1 | 3 |
|---|---|
| 0 | 2 |

| 2 | 1 |
|---|---|
| 0 | 3 |

| 3 | 1 |
|---|---|
| 0 | 2 |

| 3 | 2 |
|---|---|
| 0 | 1 |

| 2 | 3 |
|---|---|
| 0 | 1 |

| 1 | 2 |
|---|---|
| 3 | 0 |

| 1 | 3 |
|---|---|
| 2 | 0 |

| 2 | 1 |
|---|---|
| 3 | 0 |

| 3 | 1 |
|---|---|
| 2 | 0 |

| 3 | 2 |
|---|---|
| 1 | 0 |

| 2 | 3 |
|---|---|
| 1 | 0 |

FIG.4
COEFFICIENT PATTERN 1 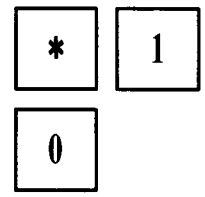
COEFFICIENT PATTERN 2 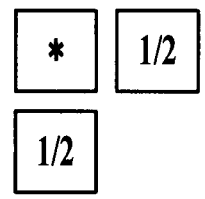
COEFFICIENT PATTERN 3 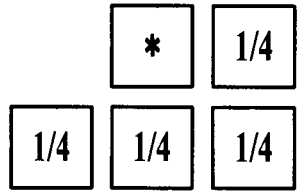
COEFFICIENT PATTERN 4 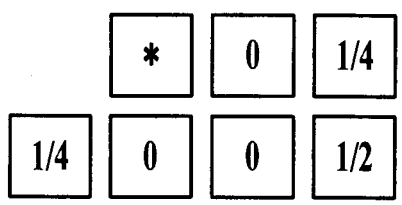
COEFFICIENT PATTERN 5 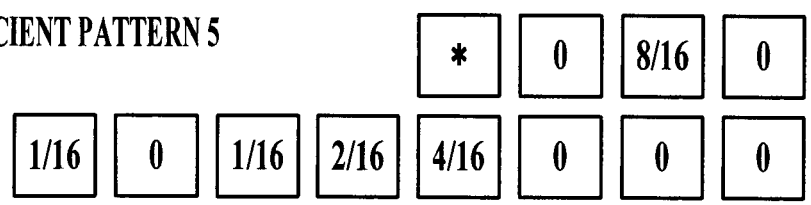
\* : TARGET PIXEL BLOCK INPUT PIXEL BLOCK     FIRST DITHER PATTERN     BLOCK DITHER PROCESSING (BINARIZATION)     OUTPUT PIXEL BLOCK

FIG.10

| | | | | | |
|---|---|---|---|---|---|
| 64 128 / 192 255 | 64 128 / 255 192 | 64 192 / 128 255 | 64 255 / 128 192 | 64 255 / 192 128 | 64 192 / 255 128 |
| 128 64 / 192 255 | 128 64 / 255 192 | 192 64 / 128 255 | 255 64 / 128 192 | 255 64 / 192 128 | 192 64 / 255 128 |
| 128 192 / 64 255 | 128 255 / 64 192 | 192 128 / 64 255 | 255 128 / 64 192 | 255 192 / 64 128 | 192 255 / 64 128 |
| 128 192 / 255 64 | 128 255 / 192 64 | 192 128 / 255 64 | 255 128 / 192 64 | 255 192 / 128 64 | 192 255 / 128 64 |

IMAGE PROCESSING APPARATUS AND IMAGE PROCESSING METHOD

BACKGROUND OF THE INVENTION

1. Field of the Invention

The present invention relates to an image processing apparatus and an image processing method.

2. Description of Related Art

The following image processing apparatus has conventionally been known: when the image processing apparatus performs image processing, the image processing apparatus binarizes multiple-valued image data of a target pixel and performs error diffusion processing to diffuse errors before and after the binarization to surrounding unprocessed pixels. If such an image processing apparatus performs the error diffusion processing to a high resolution image, the throughput of the hardware thereof is large because the workload is very large.

In view of such a problem, the conventional image processing apparatus disclosed in Japanese Patent Application Laid-Open Publication No. 2002-262089 coped with the problem by blocking a plurality of pixels, adding the gradation of each pixel constituting a block, performing dither processing to the added block to binarize the inside of the block, and diffusing the errors generated at the time of the binarization to the surrounding blocks.

However, such error diffusion processing had a problem of bringing about a fuzz of a contour part (edge portion) to deteriorate an image quality at the time of outputting a character, although the operation quantity thereof was reduced and the throughput thereof was reduced.

The conventional image processing apparatus disclosed in Japanese Patent Application Laid-Open Publication No. 2002-252764 coped with such a problem by reading a plurality of pixels by the block, judging the existence of a white pixel and a black pixel in a block, obtaining an average of pixel values (gradation values) of the pixels other than the white pixel and the black pixel in the block, performing a gradation conversion, converting the converted gradation into the area gradation pattern of each pixel in the block, and forcibly converting the pixels situated at the pixel positions of the white pixel and the black pixel at the time of reading the block into the white pixel or the black pixel, respectively.

However, although the acutance of an edge portion became capable of being attained by the image processing apparatus described in Japanese Patent Application Laid-Open Publication No. 2002-252764, such reproduction of an edge portion was limited to the data of a solid image, and fuzzes appeared at a contour of a half tone image at the time of reproducing a thin line or a character.

SUMMARY OF THE INVENTION

The present invention was devised in view of the situation mentioned above, and aims at providing an image processing apparatus and an image processing method, each capable of achieving the reduction of throughput and the improvement of the reproducibility of a high definition part of a thin line, a character, or the like even if the part has a half tone.

To achieve at least one of the abovementioned objects, an image processing apparatus reflecting one aspect of the present invention includes: a blocking section to block multiple-valued image data by a predetermined plurality of pixels to create a pixel block; an image block average value calculating section to calculate an average value of gradation values of pixels constituting the pixel block blocked by the blocking section; a gradation converting section to quantize the average value of the gradation values calculated by the image block average value calculating section based on a previously determined quantization threshold value; an edge detecting section to detect an edge portion in the pixel block based on the gradation values of the respective pixels constituting the pixel block; a pixel output order pattern setting section to set a first pixel output order pattern of a size same as a size of the pixel block for outputting dots in a descending order of the gradation values based on the gradation values of the respective pixels constituting the pixel block; a pixel output order pattern storage section to store a plurality of second pixel output order patterns, each being a pixel output order pattern of the same size as the size of the pixel block and including a previously determined output order of dots; a pixel output order pattern selecting section to select the first pixel output order pattern set by the pixel output order pattern setting section when the edge detecting section detects the edge portion in the pixel block, the pixel output order pattern selecting section selecting any of the plurality of second pixel output order patterns stored in the pixel output order pattern storage section when the edge detecting section does not detect the edge portion in the pixel block; an image data generating section to generate the image data of the pixel block in order that the dots may be output in conformity with the pixel output order pattern selected by the pixel output order pattern selecting section based on the gradation value obtained by the gradation converting section; and an error diffusion section to diffuse errors before and after the quantization of the average value of the gradation values by the gradation converting section to surrounding pixel blocks of the pixel block subjected to the quantization processing.

Preferably, the pixel output order pattern selecting section randomly selects any one of the plurality of second pixel output order patterns when the edge detecting section does not detect any edge portion in the pixel block.

Preferably, the edge detecting section detects the edge portion based on a relation between a difference between a gradation value of a pixel having a maximum gradation value in the pixel block and a gradation value of a pixel having a minimum gradation value in the pixel block and a predetermined edge detecting threshold value.

Preferably, the pixel block is composed of n (n is a natural number) pixels; and the quantization threshold value is determined in order that the average value of the gradation values of the pixels constituting the pixel block after the quantization by the gradation converting section may be converted to be in (n+1) values.

Preferably, the image processing apparatus further includes an attribute information judging section to input therein pieces of attribute information indicating attributes of the pixels constituting the pixel block to judge the pieces of attribute information, wherein the edge detecting section detects the edge portion in the pixel block only when the attribute information judging section judges that the pieces of attribute information indicating a character attribute are included in the pixel block.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 3 is a view for describing the configurations of second block dithers;

FIG. 4 is a view showing diffusion coefficient patterns;

FIG. 10 is a view for describing the configurations of second block dithers;

DESCRIPTION OF THE PREFERRED EMBODIMENTS

In the following, embodiments of the present invention will be described with reference to the accompanying drawings. However, the scope of the invention is not limited to the shown examples. Incidentally, the components having the same functions and the same configurations will be denoted by the same marks, and the descriptions of the components will be omitted in the following description.

First Embodiment

Figure 1:
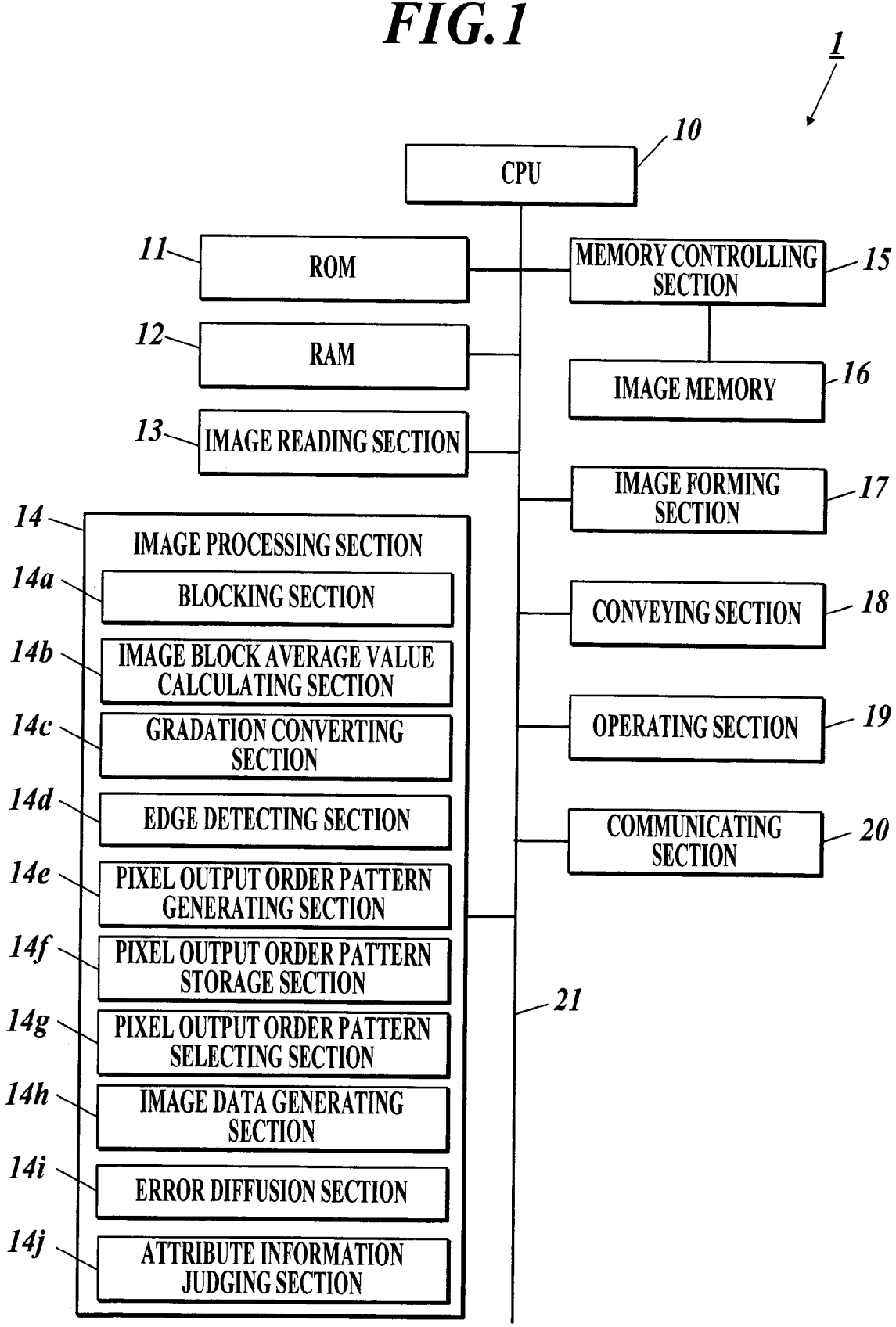
FIG. 1 is a block diagram showing the internal configuration of the image forming apparatus of a first embodiment.

As shown in FIG. 1, an image forming apparatus 1 as an image processing apparatus is composed of, for example, a central processing unit (CPU) 10, a read only memory (ROM) 11, a random access memory (RAM) 12, an image reading section 13, an image processing section 14, a memory controlling section 15, an image memory 16, an image forming section 17, a conveying section 18, an operating section 19, and a communicating section 20. Each section is mutually connected with a bus 21.

The CPU 10 centrally controls each section of the image forming apparatus 1. The CPU 10 develops various system programs stored in the ROM 11 and a program designated among the application programs such as an image converting program for executing the image converting processing, which will be described later, into the RAM 12, and executes various pieces of processing in corporation with the developed programs.

The ROM 11 stores various programs for realizing various functions pertaining to the operations of the image forming apparatus 1 which functions are executed by the CPU 10 and various pieces of data to be used at the time of the execution of the various programs. In particular, the ROM 11 stores the image converting program, the data of a quantization threshold value to be used at the time of the quantization of a gradation value in the image processing section 14, the data of an edge detecting threshold value to be used at the time of an edge section judgment in the image processing section 14, the data of a diffusion coefficient pattern to be used at the time of error diffusion processing, and the like.

The RAM 12 develops various control programs to be executed by the CPU 10 into a program storing area, and temporarily stores input data and the data such as processing results generated at the time of the execution of various control programs into a work area.

The image reading section 13 is composed of a scanner and the like, and reads image information of an original with the scanner to generate image data. To put it concretely, the image reading section 13 scans an original placed on a transparent contact glass with illumination from a light source, and forms an image on a charge coupled device (CCD) with the reflected light of the illumination to perform the photoelectric conversion of the image. The image reading section 13 thereby generates multiple-valued image data to output the generated multiple-valued image data to the image processing section 14.

The image processing section 14 performs various pieces of image processing, such as variable power processing, filter processing, and gamma conversion processing, to input multiple-valued image data. Moreover, the image processing section 14 includes a blocking section 14a, an image block average value calculating section 14b, a gradation converting section 14c, an edge detecting section 14d, a pixel output order pattern generating section 14e, a pixel output order pattern storage section 14f, a pixel output order pattern selecting section 14g, an image data generating section 14h, an error diffusion section 14i, and an attribute information judging section 14j.

The blocking section 14a blocks input image data by the predetermined plurality of pixels to convert the input image data to pixel blocks. In the present embodiment, the blocking section 14a blocks the input image data in such a way that the size of each pixel block is 2×2=4 pixels. Incidentally, the size of a pixel block after blocking can arbitrarily be set. Moreover, the blocking section 14a does not always block all pieces of image data into the pixel blocks having the same size, but may block image data into ones having sizes different in regions.

The image block average value calculating section 14b calculates an average value of multiple-valued gradation values of the pixels constituting a pixel block blocked by the blocking section 14a. To put it concretely, for example, if the multiple-valued gradation values of the pixels constituting the pixel block are "0," "120," "192," and "255," the average value of the gradation values of the pixel block becomes "142." Incidentally, as described below, a quantization error diffused by the error diffusion section 14i is added to the calculated average value of the gradation values of a pixel block.

The gradation converting section 14c converts (quantizes) the average value of the multiple-valued gradation values in a pixel block of a processing object (target pixel block) calculated by the image block average value calculating section 14b in order to decrease the gradation number of the target pixel block. To put it concretely, the gradation converting section 14c reads out the data of the quantization threshold values stored in the ROM 11 and holds quantization threshold values THR0-THR3 in a threshold value register (not shown) in the image processing section 14 to convert the average value of the multiple-valued (256 values) gradation values of the target pixel block by the comparison with the quantization threshold values THR0-THR3 held in the threshold value register. The quantization threshold values THR0-THR3 are set to be, for example, "THR0=32," "THR1=96," "THR2=160," and "THR3=224." Then, the gradation converting section 14c quantizes the average value of the gradation values of the target pixel block into 5 values with the quantization threshold values THR0-THR3 in conformity with the following conditions.

gradation value of target pixel<THR0→gradation value=0

THR0≤gradation value of target pixel<THR1→gradation value=64

THR1≤gradation value of target pixel<THR2→gradation value=128

THR2≤gradation value of target pixel<THR3→gradation value=192

THR3≤gradation value of target pixel→gradation value=255

For example, if the average value of the gradation values of a target pixel block is "142," the gradation value after quantization becomes "128."

Incidentally, if the gradation number after the quantization of the average value of the multiple-valued gradation values of a pixel block has been obtained by the following formula (1), it is preferable because the quantization threshold values fitted to the gradation reproduction of a pixel block to be output can be set. Incidentally, it is supposed that the value of (n) in the following formula (1) is a natural number.

gradation number after quantization of the average value of multiple-valued gradation values of a pixel block=number of pixel blocks(n)+1    (1)

Because the number of the pixel blocks (n)=4 in the present embodiment, the gradation number after quantization of the average value of the multi-valued gradation values in a pixel block is set to be 5.

Incidentally, although it is determined to use the four values of THR0-THR3 as the quantization threshold values in order to quantize the average value of the multiple-valued gradation values of a pixel block to 5 values in the present embodiment, the setting number of the quantization threshold values is not limited to this number. Moreover, also each of the threshold values THR0-THR3 can arbitrarily be set. Moreover, the quantization may also be performed by converting the average value by using a gradation conversion LUT stored in the ROM 11 besides using the threshold values.

The edge detecting section 14d judges whether a target pixel block includes an edge portion or not on the basis of the gradation values of the respective pixels constituting the target pixel block to detect the edge portion. To put it concretely, the edge detecting section 14d reads out the data of the edge detecting threshold values stored in the ROM 11 to hold an edge detecting threshold value THR4 in the threshold value register in the image processing section 14, and specifies a pixel having the maximum gradation value and a pixel having the minimum gradation value among the pixels constituting the target pixel block to calculates the difference between these gradation values of these pixels. Then, when the edge detecting section 14d judges that the difference between the gradation values is the edge detecting threshold value THR4 or more, then the edge detecting section 14d detects that the target pixel block includes the edge portion. Incidentally, the edge detecting threshold value THR4 can arbitrarily be set according to user's preference, but it is preferable that the edge detecting threshold value THR4 is set within a range of from "32" to "64." If the edge portion of a character is wanted to be made to be clear in the present embodiment, it is only necessary to set the edge detecting threshold value THR4 to be small. For example, if the edge portion of a character having a pale gradation is wanted to be clear, it is effective to set the edge detecting threshold value THR4 to be "32." Moreover, for example, if a transition of a gradation from a boundary line of an image having a pale gradation to the inside of the image having a pale gradation is made to be natural together with the clarification of the edge portion of a character having a pale gradation, then it is effective to set the edge detecting threshold value THR4 to be a numerical value close to "64."

Figure 2:
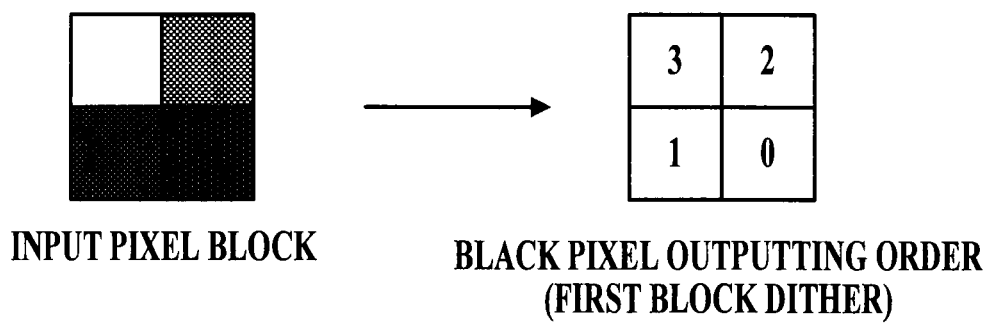
FIG. 2 a view for describing a first block dither generating process.

The pixel output order pattern generating section 14e generates a block dither (first block dither) having the same size as that of a target pixel block. To put it concretely, the pixel output order pattern generating section 14e generates a block dither by which dots are output in the descending order of the gradation values of the pixels constituting the target pixel block. For example, as shown in FIG. 2, if the gradation values of the pixels arranged in the upper left portion, the upper right portion, the lower left portion, and the lower right portion of a target pixel block are "0," "120, "192," and "255," respectively, then a block dither by which dots are output in the order of the lower right portion one, the lower left portion one, the upper right portion one, and the upper left portion one is generated. Incidentally, the generated block dither is held in, for example, a predetermined not-shown memory region.

The pixel output order pattern storage section 14f stores block dithers (second block dithers), each having the same size as that of a pixel block. To put it concretely, the pixel output order pattern storage section 14f stores a plurality of kinds of block dithers, each having a previously determined output order of dots as shown in FIG. 3.

The pixel output order pattern selecting section 14g selects a block dither according to a detection result of an edge portion by the edge detecting section 14d. To put it concretely, when the edge detecting section 14d detects an edge portion in a target pixel block, the pixel output order pattern selecting section 14g reads out the first block dither generated by the pixel output order pattern generating section 14e. When the edge detecting section 14d does not detect any edge portion in a target pixel block, the pixel output order pattern selecting section 14g randomly reads out one of the second block dithers from the pixel output order pattern storage section 14f. Incidentally, the selecting method of one of the second block dithers can be realized by, for example, extracting a sampling value from a not-shown random number generator to select a block dither corresponding to the sampling value. Alternatively, the selecting method may also be realized by generating a sampling value by means of software random numbers without using any random number generators to select a block dither on the basis of the sampling value.

The image data generating section 14h performs block dither processing of generating a pixel block in such a way that dots are output in conformity with a block dither selected by the pixel output order pattern selecting section 14g on the basis of the gradation value in a target pixel block obtained by the gradation converting section 14c, and outputs the generation result. To put it concretely, for example, if the first block dither shown in FIG. 2 is selected by the pixel output order pattern selecting section 14g when the gradation value in a target pixel block quantized by the gradation converting section 14c is "128," then the image data generating section 14h converts each of the pixels constituting the target pixel block into 2-value data. Consequently, the pixels in the lower right portion and the lower left portion of the target pixel block are each converted to a value of dot-on, and the pixels in the upper right portion and the upper left portion are each converted to a value of dot-off.

The error diffusion section 14i holds the error values of the gradation values of a target pixel block before and after the quantization of the gradation values by the gradation converting section 14c in a buffer memory (not shown) in the image processing section 14, and diffuses the error values to peripheral pixel blocks in which multiple-valued image data has not been processed yet. The error diffusion section 14i thereby performs error diffusion processing of adding the error values to the average value of the gradation values of each of the peripheral pixel blocks calculated by the image block average value calculating section 14b. To put it concretely, the error diffusion section 14i reads out the data of a diffusion coefficient pattern stored in the ROM 11 to hold the read-out data in a coefficient pattern register (not shown) in the image processing section 14 in the state in which a user can select the data, and multiplies the error values of a target pixel block by each coefficient shown in a diffusion coefficient pattern after user's selection, which diffusion coefficient pattern is held in the coefficient pattern register, to add the multiplied values to the average values of the gradation values before quantization of the respective peripheral pixel blocks.

Examples of diffusion coefficient patterns are described here. The ROM 11 stores the data of a plurality of different diffusion coefficient patterns (coefficient patterns 1-5) such as ones shown in FIG. 4. On the basis of one of the coefficient patterns 1-5, the respective diffusion coefficients of the peripheral pixel blocks are multiplied by the errors of the gradation values before and after quantization of a target pixel block "*," and the products of the multiplications are added to the average values of the gradation values before quantization of the peripheral pixel blocks. The diffusion coefficient patterns can be selected and set by user's operations.

The attribute information judging section 14j judges the attribute information of each of the pixels constituting a pixel block. The attribute information is, here, for example, the data indicating the attribute of each pixel interpreted on the basis of the image data described by the Page Description Language (PDL) transmitted from a client computer or the like, and the attribute includes a character, a foundation, an image, and the like. The attribute information is the information to be input into the image processing section 14 together with the data indicating the gradation values of the respective pixels.

Although the present embodiment is configured to realize the functions of the blocking section 14a, the image block average value calculating section 14b, the gradation converting section 14c, the edge detecting section 14d, the pixel output order pattern generating section 14e, the pixel output order pattern selecting section 14g, the image data generating section 14h, and the attribute information judging section 14j by the software processing in corporation with the CPU 10 and the programs stored in the ROM 11, these functions may be realized by providing the circuits, special purpose processors, and the like for functioning each of these sections into the image processing section 14 or the like.

Moreover, the pixel output order pattern storage section 14f may be provided on the outside of the image processing section 14, for example, in the ROM 11, besides being provided in the image processing section 14.

The memory controlling section 15 controls access to the image memory 16 at the time of reading out and writing in image data. The image memory 16 is composed of a volatile or a nonvolatile recording medium, and stores the image data processed by the image processing section 14.

The image forming section 17 forms an image onto a sheet of transfer paper by a predetermined printing system (such as an electrophotographic printing system, an ink jet system, or a thermal transfer system) in conformity with a printing controlling signal from the CPU 10. The conveying section 18 conveys a sheet of transfer paper before and after image formation with a plurality of rollers.

The operating section 19 is composed of various function keys, such as numeric keys and a start key, and a touch panel integrally configured with a display screen, such as a liquid crystal display (LCD). The operating section 19 outputs an operation signal corresponding to a key operation and an operation signal corresponding to an input operation of the touch panel to the CPU 10.

The communicating section 20 is composed of a network interface card (NIC) or the like, and mediates the transmission and the reception of the information of image data and the like with external equipment, such as a personal computer (PC) and a print server.

Next, the image converting processing executed in the image forming apparatus 1 configured as described above will be described with reference to FIG. 5. The image converting processing is the processing executed when image data is input from the image reading section 13 and the communicating section 20.

First, the CPU 10 transmits the image data input into the image forming apparatus 1 to the image processing section 14, and the blocking section 14a performs the blocking of the pixels of the image data to generate pixel blocks (Step S100).

Then, the CPU 10 reads in the pixel block that will be processed first among the generated pixel blocks as a target pixel block (Step S101), and the image block average value calculating section 14b calculates the average value of the gradation values of the pixels constituting the target pixel block (Step S102). The present embodiment is configured to set the pixel block in the upper left portion constituting the image data to be the pixel block to be processed first and to perform processing into the main scanning direction and the sub-scanning direction in order. Incidentally, the processing order of pixel blocks is not limited to the aforesaid one.

Next, the CPU 10 produces a first block dither corresponding to the target pixel block with the pixel output order pattern generating section 14e (Step S103).

Then, the CPU 10 refers to the attribute information of the respective pixels constituting the target pixel block with the attribute information judging section 14j (Step S104).

Then, the CPU 10 judges whether a character attribute indicating a character is included in the attribute information of any of the pixels constituting the target pixel block or not (Step S105). If the CPU 10 judges that the character attribute is included (Step S105: Yes), the CPU 10 judges whether the difference between the maximum gradation value and the minimum gradation value is the edge detecting threshold value THR4 or not with edge detecting section 14d in the way described above (Step S106).

If the CPU 10 judges that the difference is the edge detecting threshold value THR4 or more (Step S106: Yes), the CPU 10 reads out the first block dither generated by the pixel output order pattern generating section 14e at Step S103 with the pixel output order pattern selecting section 14g (Step S107).

Moreover, if the CPU 10 does not judge that any character attributes are included at Step S105 (Step S105: No), or if the CPU 10 does not judge that the difference is edge detecting threshold value THR4 or more at Step S106 (Step S106: No), then the CPU 10 randomly selects any of the plurality of second block dithers stored in the pixel output order pattern storage section 14f to read out the selected second block dither with the pixel output order pattern selecting section 14g (Step S108).

Next, the CPU 10 quantizes the average value of the gradation values of the target pixel block calculated at Step S102 with the gradation converting section 14c (Step S109).

Then, the CPU 10 performs the aforesaid block dither processing to output dots from the quantized gradation values of the target pixel block obtained at Step S109 in conformity with the block dither selected at Step S107 or S108 with the image data generating section 14h, and the CPU 10 outputs the results of the block dither processing (Step S110).

Then, the CPU 10 diffuses the quantization errors generated at Step S109 to the unprocessed peripheral pixel blocks with the error diffusion section 14i (Step S111).

Then, the CPU 10 judges whether the processing at Steps S101-S111 has been performed to all the pixel blocks or not (Step S112). If the CPU 10 judges that the processing has been performed to all the pixel blocks (Step S112: Yes), the CPU 10 ends this processing. On the other hand, if the CPU 10 does not judge that the processing has been performed to all the pixel blocks (Step S112: No), the CPU 10 transits the pixel block to be processed as the target pixel block and executes the processing at Step S101.

Figure 6:
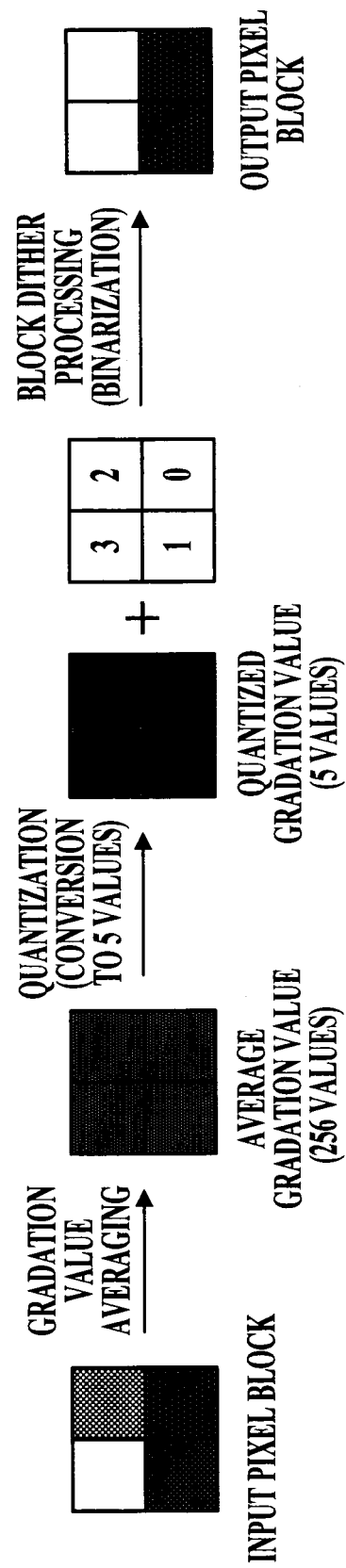
FIG. 6 is a view for describing the processes of image processing.

The operating procedure of image data executed by the image forming apparatus 1 configured as described above will be described with reference to FIG. 6.

First, input image data is blocked every 2×2=4 pixels by the blocking section 14a. Then, one of the pixel blocks of the blocked image data is read in as a target pixel block. Incidentally, in this description, a pixel block including an edge portion and having the gradation values of "0," "120," "192," and "255," as ones of the pixel in the upper left portion, the pixel in the upper right portion, the pixel in the lower left portion, and the pixel in the lower right portion, respectively, is exemplified as the target pixel block to be described.

Next, the image block average value calculating section 14b averages the gradation values of the pixels constituting the target pixel block, and "142" is calculated as the average value of the gradation values of the pixels in the target pixel block as the result.

After that, the gradation converting section 14c quantizes the average value of the gradation values of the pixels in the target pixel block from 256 values to 5 values, and consequently the quantized gradation value of the target pixel block becomes "128."

Then, block dither processing is performed to output dots from the quantized gradation value in conformity with the first block dither produced with the image data generating section 14h as shown in FIG. 2, and consequently the gradation values of the respective pixels in the target pixel block are binarized in such a way that the pixels in the lower right portion and the lower left portion in the target pixel block become dot-on, and on the other hand, the pixels in the upper left portion and the upper right portion are dot-off.

Incidentally, if no edge portions are included in the target pixel block, any of the second block dithers stored in the pixel output order pattern storage section 14f is selected, and block dither processing is performed in conformity with the selected second block dither.

Incidentally, although the present embodiment is configured to generate the first block dither with the pixel output order pattern generating section 14e, and to perform block dither processing when an edge portion is detected in a target pixel block, it is also possible to obtain a similar result by selecting the optimum one from, for example, the block dithers stored in the pixel output order pattern storage section 14f as the first block dither, and by performing the block dither processing on the basis of the selected optimum block dither.

Figure 5:
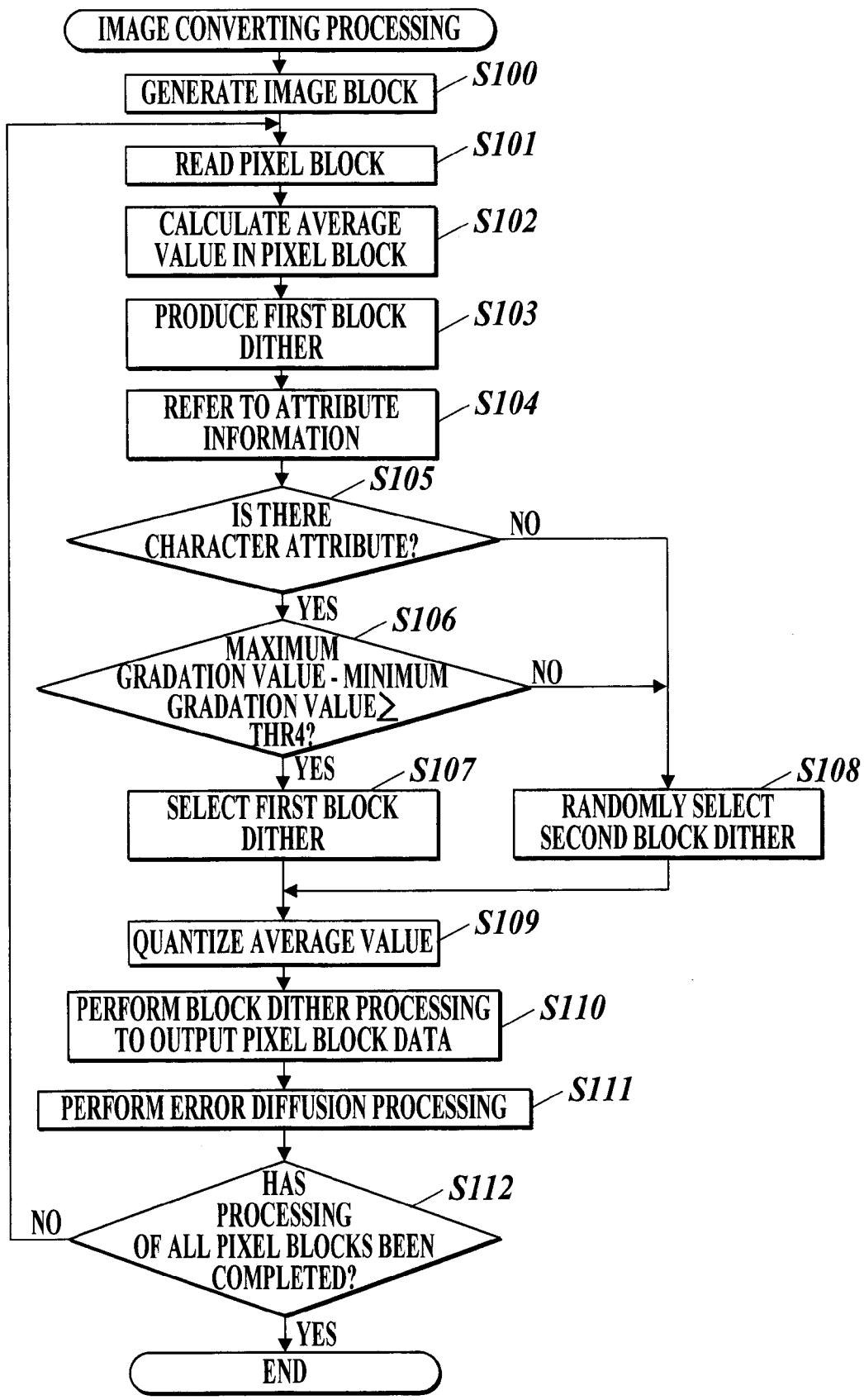
FIG. 5 is a flow chart for describing the image converting processing in the first embodiment.
Figure 7:
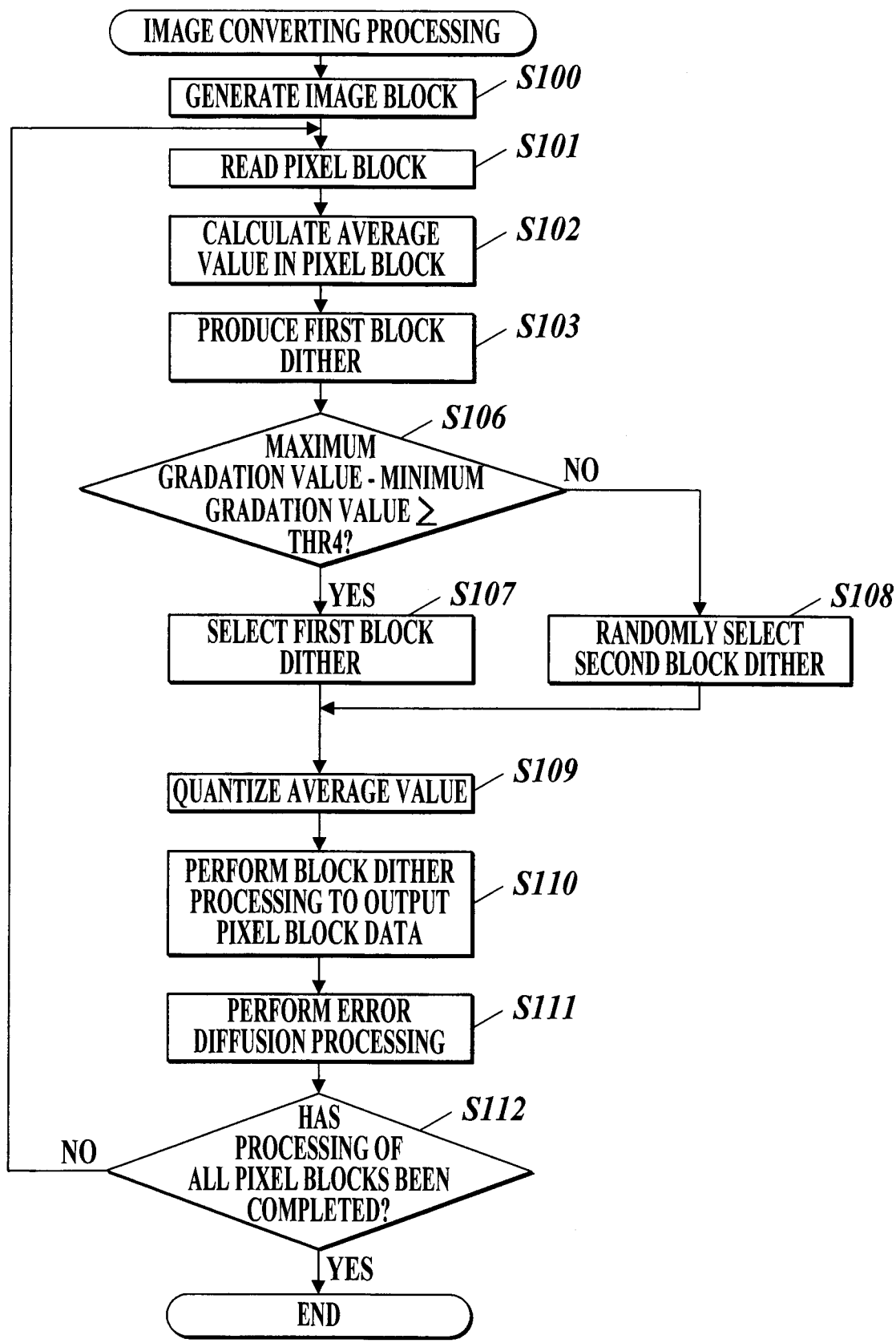
FIG. 7 is a flow chart for describing another aspect of the image converting processing in the first embodiment.

Moreover, although the first embodiment is configured, as shown in FIG. 5, to refer to the attribute information of the respective pixels constituting the target pixel at Step S104, to judge whether a character attribute indicating a character is included in the attribute information of any pixel constituting the watching block or not at Step S105, and to perform edge detection when the character attribute is judged to be included, it is also possible not to execute the processing at Steps S104 and S105, namely, not to judge whether any character attributes are included or not, to perform edge detection as shown in FIG. 7. If such a configuration is adopted, the throughput of the configuration becomes somewhat larger than that of the configuration shown in FIG. 5, but the improvement of the reproducibility of not only the edge portion of a character region but also that of the boundary parts of an image and the like can be achieved. Incidentally, the other processes of this configuration are similar to those of the configuration shown in FIG. 5, their descriptions are omitted.

Second Embodiment

Figure 8:
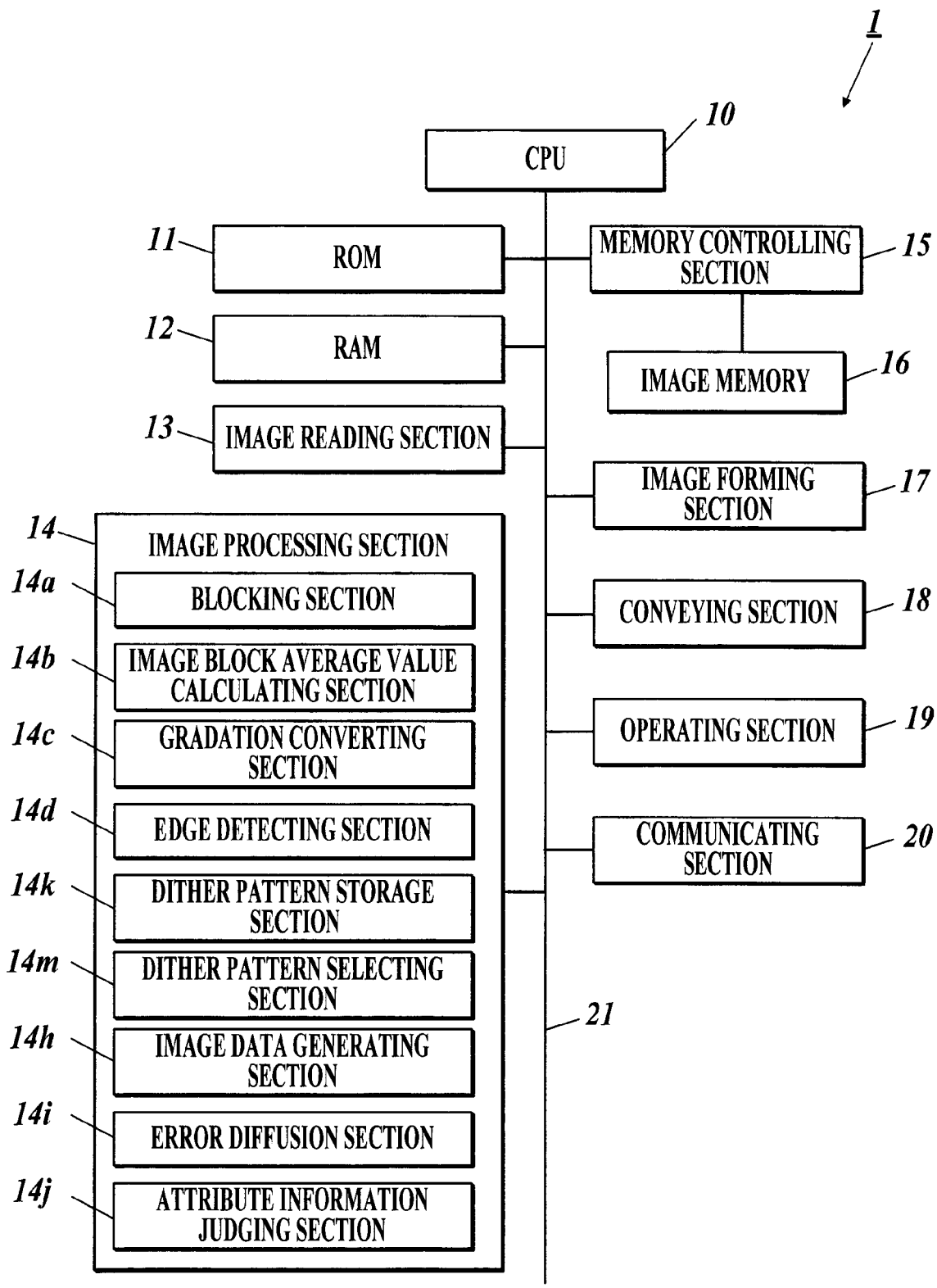
FIG. 8 is a block diagram showing the internal configuration of the image forming apparatus of a second embodiment.

Next, a second embodiment will be described. In the second embodiment, as shown in FIG. 8, the pixel output order pattern generating section 14e, the pixel output order pattern storage section 14f, and the pixel output order pattern selecting section 14g, each constituting the image processing section 14 of the first embodiment, are changed to a dither pattern storage section 14k and a dither pattern selecting section 14m. Incidentally, in the second embodiment, the parts different from those of the first embodiment are described, and the descriptions of the other parts are omitted.

In the second embodiment, the image block average value calculating section 14b calculates the average value of the gradation values of the pixels constituting a target pixel block only when the edge detecting section 14d does not judge that any edge portion is included in the target pixel block. That is, the image block average value calculating section 14b does not calculate the average value of the gradation values of the pixels in a pixel block in which an edge portion is included, and performs the calculations of the average values of the gradations of the pixels in the pixel blocks in which no edge portions are included. Incidentally, the calculations of the average values of the gradation values in the pixel blocks in which edge portions are included may be performed to the pixel blocks.

The gradation converting section 14c is similar to the first embodiment other than the respect of performing the quantization of the average values of the gradation values in the pixel blocks that do not include any edge portions.

The dither pattern storage section 14k stores a plurality of block dithers, each having the same size as that of a pixel block. The block dithers of the second embodiment have a binarization threshold value correspondingly to each pixel differently from the first embodiment. The block dithers stored in the dither pattern storage section 14k include a block dither (first block dither) to be selected when the edge detecting section 14d detects an edge portion in a target pixel block, and block dithers (second block dithers) to be selected when the edge detecting section 14d does not detect any edge portions in a target pixel block.

Figure 9:
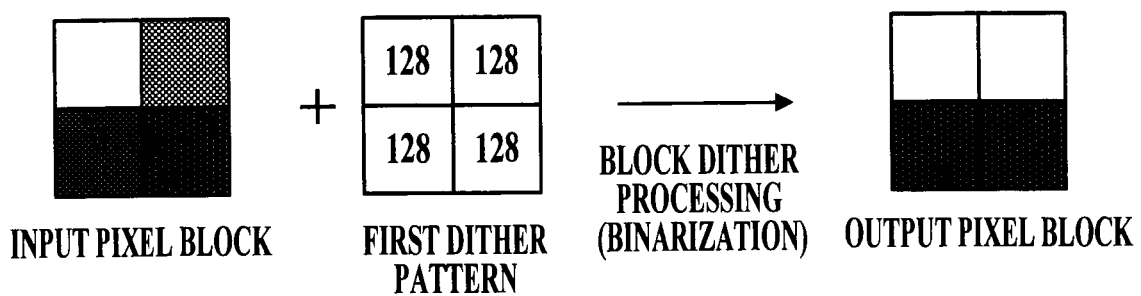
FIG. 9 is a view for describing the processes of image processing.

The first block dither is composed of a dither pattern, for example, one shown in FIG. 9, for binarizing the gradation values of the respective pixels at the time of reading in a target pixel block. That is, the first block dither is configured to binarize the gradation values of all the pixels with the same dither threshold value. Incidentally, in the present embodiment, the dither threshold value is set to "128," but the dither threshold value may take another value.

The second block dithers are composed of dither patterns to binarize the respective pixels with dither threshold values that are assigned to the respective pixels and are different from one another to the respective pixels as shown in FIG. 10, for example, in order that the output order of dots may be a predetermined order to the average value of the gradation values of a target pixel block quantized by the gradation converting section 14c similarly to the first embodiment. Moreover, as shown FIG. 10, the dither pattern storage section 14k stores the plurality of second block dithers in which the arrangements of dither threshold values are different.

The dither pattern selecting section 14m selects any one of the first block dither and the second block dithers from the dither pattern storage section 14k according to the detection result of an edge portion in the edge detecting section 14d to read out the selected block dither. That is, the dither pattern selecting section 14m reads out the first block dither when the edge detecting section 14d detects an edge portion in a target pixel block, and reads out any of the plurality of second block dithers when the edge detecting section 14d does not detect any edge portions in the target pixel block. Incidentally, the selection of the second block dither is randomly performed, and the selecting method of the second block dither is similar to that of the first embodiment.

The image data generating section 14h executes the block dither processing of the content according to the detection result of the edge portion by the edge detecting section 14d, and outputs the result of the block dither processing. To put it concretely, when the edge detecting section 14d detects an edge portion in a target pixel block, the image data generating section 14h executes the block dither processing in order that dots may be output from the gradation value of the respective pixels in the target pixel block at the time of reading in conformity with the first block dither selected by the dither pattern selecting section 14m, and quantizes the gradation values of the respective pixels constituting the target pixel block each from 256 values to 2 values. For example, as shown in FIG. 9, the gradation values of the pixel arranged in the upper left portion, the pixel arranged in the upper right portion, the pixel arranged in the lower left portion, and the pixel arranged in the lower right portion at the reading in the target pixel block are "0," "120," "192," and "255," respectively, and the first block dither is applied to quantize the respective pixels constituting the target pixel block to the 2-value data. In such a case, the pixels in the lower right portion and the lower left portion in the target pixel block are each converted to be a dot-on value, and the pixels in the upper right portion and the upper left portion are each converted to be a dot-off value. Here, a quantization error is produced in each pixel at the time of the quantization, and these quantization errors are summed up to be diffused to the surrounding pixel blocks by the error diffusion section 14i.

Moreover, when the edge detecting section 14d does not detect any edge portions in a target pixel block, the image data generating section 14h performs the block dither processing of generating pixel blocks in order that dots may be output in conformity with the second block dither selected by the dither pattern selecting section 14m on the basis of the gradation value of the target pixel block obtained by the gradation converting section 14c, and the image data generating section 14h outputs the generation result. To put it concretely, the image data generating section 14h, for example, converts the pixel in the lower right position of a target pixel block into a dot-on value and converts the other pixels of the target pixel block into dot-off values when the gradation value of the target pixel block quantized to 5 values by the gradation converting section 14c is "64," and when the dither pattern selecting section 14m selects a second block dither, in which the dither threshold values of the pixel in the upper left portion, the pixel in the upper right portion, the pixel in the lower left portion, and the pixel in the lower right portion are "255," "128," "192," and "64," respectively, and further when each pixel constituting the target pixel block is further quantized into 2 value data. Incidentally, although the dither threshold values of the second block dither are set correspondingly to 5 values lest no quantization errors should be generated in this case, the dither threshold values generating errors at the time of the quantization to 2 values may be set. In this case, it is preferable to perform the error diffusion to the surrounding pixel blocks in such a way that has been described above.

The error diffusion section 14i holds the error values of the gradation values of a target pixel block before and after the quantization of the gradation values by the gradation converting section 14c and the summed-up error values of the gradation values of the target pixel block which error values have been produced at the time of block dither processing by the image data generating section 14h into the buffer memory (not shown) in the image processing section 14, and the error diffusion section 14i diffuses the error values to the peripheral pixel block to which any processing of multiple-valued image data has been performed. The other respects are similar to those of the first embodiment.

Figure 11:
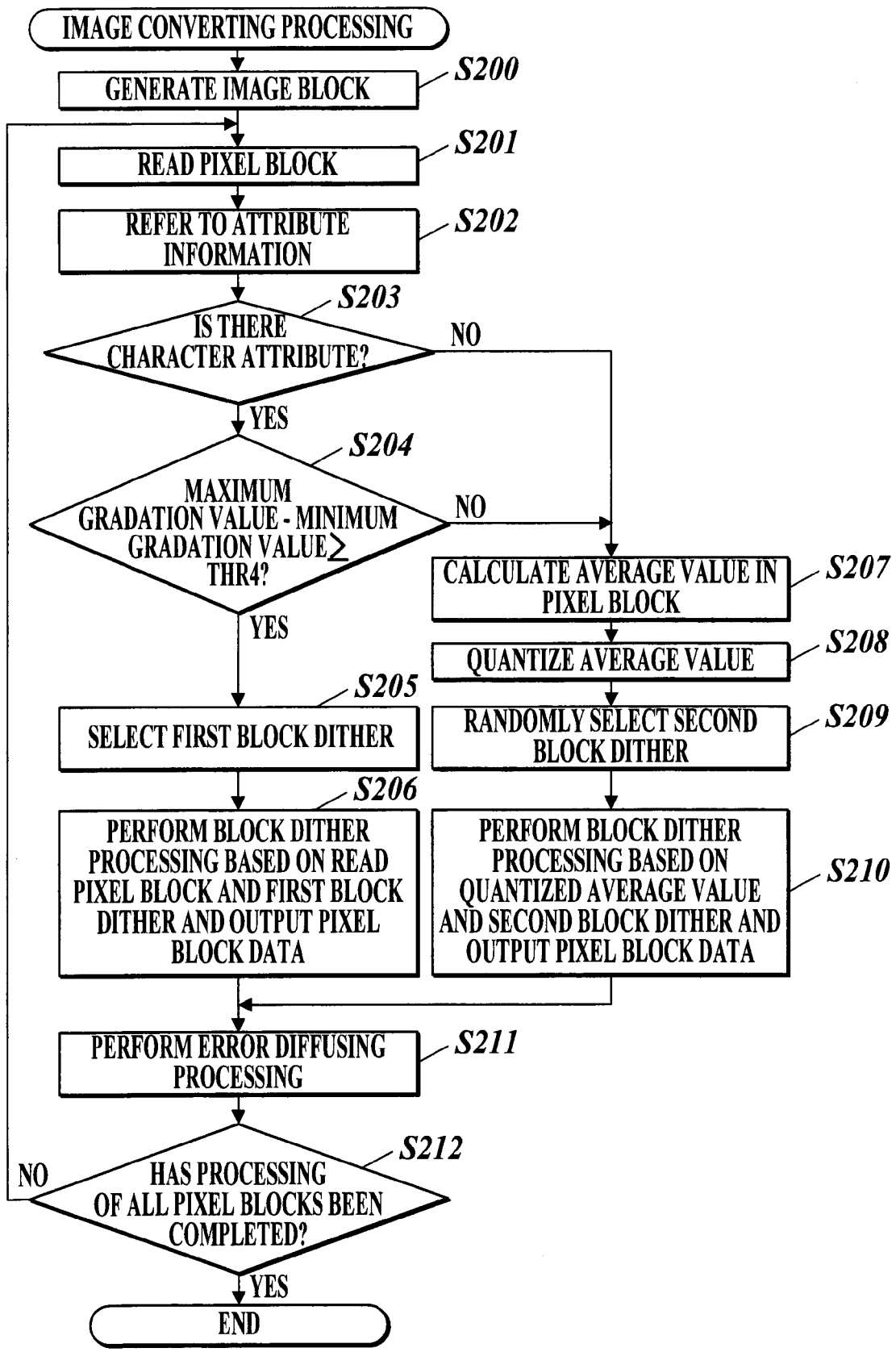
FIG. 11 is a flow chart for describing the image converting processing in the second embodiment.

Next, image converting processing executed in the image forming apparatus 1 of the second embodiment configured as described above will be described with reference to FIG. 11. The image converting processing is the processing that is executed when image data is input from the image reading section 13 or the communicating section 20 similarly to the first embodiment.

First, the CPU 10 transmits the image data input into the image forming apparatus 1 to the image processing section 14, and the blocking section 14a performs the blocking of the pixels of the image data to generate pixel blocks (Step S200).

Next, the CPU 10 reads in the pixel block that is processed first among the generated pixel blocks as a target pixel block (Step S201), and the CPU 10 refers to the attribute information of each pixel constituting the target pixel block with the attribute information judging section 14j (Step S202).

Then, the CPU 10 judges whether a character attribute indicating a character is included in the attribute information of any of the pixels constituting the target pixel block or not (Step S203). If the CPU 10 judges that the character attribute is included (Step S203: Yes), the CPU 10 judges whether the difference between the maximum gradation value and the minimum gradation value is the edge detecting threshold value THR4 or more or not with the edge detecting section 14d in the way described above (Step S204).

If the CPU 10 judges that the difference is the edge detecting threshold value THR4 or more (Step S204: Yes), the CPU 10 selects and reads out the first block dither from the dither pattern storage section 14k with the dither pattern selecting section 14m (Step S205).

Then, the CPU 10 performs the aforesaid block dither processing in order to output dots from the gradation values of the respective pixels at the time of reading in the target pixel block in conformity with the first block dither selected at Step S205 with the image data generating section 14h, and the CPU 10 outputs the result of the block dither processing (Step S206).

Moreover, if the CPU 10 does not judge that any character attribute is included at Step S203 (Step S203: No), or if the CPU 10 does not judge that the difference is edge detecting threshold value THR4 or more at Step S204 (Step S204: No), the CPU 10 calculates the average value of the gradation values of the pixels constituting the target pixel block with the image block average value calculating section 14b (Step S207).

Next, the CPU 10 performs the quantization of the average value of the gradation values of the target pixel block calculated at Step S207 with the gradation converting section 14c (Step S208).

Then, the CPU 10 randomly selects any of the plurality of second block dithers stored in the dither pattern storage section 14k to read out the selected second block dither with the dither pattern selecting section 14m (Step S209).

Then, the CPU 10 performs the aforesaid block dither processing to output dots in conformity with the block dither selected at Step S209 on the basis of the quantized gradation value of the target pixel block obtained at Step S208 with the image data generating section 14h, and the CPU 10 outputs the results of the block dither processing (Step S210).

Then, the CPU 10 diffuses the quantization errors generated at Steps S206 and S208 to the unprocessed peripheral pixel blocks with the error diffusion section 14i (Step S211).

Then, the CPU 10 judges whether the processing at Steps S201-S211 has been performed to all the pixel blocks or not (Step S212). If the CPU 10 judges that the processing has been performed to all the pixel blocks (Step S212: Yes), the CPU 10 ends this processing. On the other hand, if the CPU 10 does not judge that the processing has been performed to all the pixel blocks (Step S212: No), the CPU 10 transits the pixel block to be processed as the target pixel block and executes the processing at Step S201.

The operating procedure of image data to be executed by the image forming apparatus 1 configured as described above will be described with reference to FIG. 12.

First, input image data is blocked every 2×2=4 pixels by the blocking section 14a. Then, one of the pixel blocks of the blocked image data is read in as a target pixel block. Incidentally, in this description, an pixel block having no edge portions and having gradation values "70," "100," "80," and "75," of the pixel in the upper left portion, the pixel in the upper right portion, the pixel in the lower left portion, and the pixel in the lower right portion, respectively, will be exemplified to be described as a target pixel block.

Next, the image block average value calculating section 14b averages the gradation values of the pixels constituting the target pixel block, and "81" is calculated as the average value of the gradation values of the pixels in the target pixel block as the result.

After that, the gradation converting section 14c quantizes the average value of the gradation values of the pixels in the target pixel block from 256 values to 5 values, and consequently the quantized gradation value of the target pixel block becomes "64."

Figure 12:
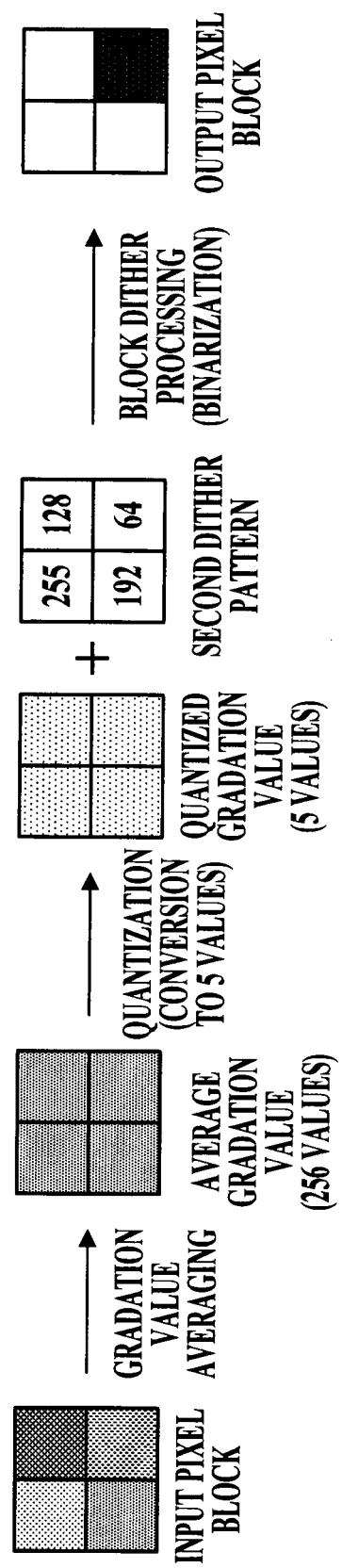
FIG. 12 is a view for describing the processes of image processing.

Then, any of the second block dithers stored in the dither pattern storage section 14k is selected. Incidentally, in this case, the description will be performed on the supposition that the second block dither having the dither threshold values "255," "128," "192," and "64" of the pixel in the upper left portion, the pixel in the upper right portion, the pixel in the lower left portion, and the pixel in the lower right portion, respectively, as shown in FIG. 12 is selected.

Then, block dither processing is performed to output dots in conformity with the selected second block dither on the basis of the quantized gradation value with the image data generating section 14h, and consequently the gradation value of each pixel in the target pixel block is binarized in such a way that the pixel in the lower right portion in the target pixel block become dot-on, and on the other hand, the other pixels are dot-off.

Incidentally, if an edge portions is included in the target pixel block, the block dither processing is performed like that described with reference to FIG. 9.

Incidentally, although the present embodiment sets the dither threshold values in order that the gradation values may be quantized from 256 values to 2 values when a target pixel block includes an edge portion, the dither threshold values may be set in order to quantize the gradation values to 3 values or more.

Moreover, also the second embodiment may be configured to detect an edge portion independently of attribute information similarly to the first embodiment.

As described above, according to the first embodiment, the blocking section 14a blocks multiple-valued image data by the predetermined plurality of pixels to create pixel blocks. Then, the image block average value calculating section 14b calculates the average value of the gradation values of the pixels constituting a pixel block blocked by the blocking section 14a. Then, the gradation converting section 14c quantizes the average value of the gradation values calculated by the image block average value calculating section 14b on the basis of the previously determined quantization threshold values THR0-THR3. Then, the edge detecting section 14d detects an edge portion in a pixel block on the basis of the gradation values of the respective pixels constituting the pixel block. Then, the pixel output order pattern generating section 14e sets a first block dither having the same size as a pixel block to output dots in the descending order of the gradation values on the basis of the gradation values of the respective pixels constituting the pixel block. Then, the pixel output order pattern storage section 14f stores a plurality second block dithers, each having the same size as that of a pixel block and including a previously determined output order of dots. Then, the pixel output order pattern selecting section 14g selects the first block dither generated by the pixel output order pattern generating section 14e when the edge detecting section 14d detects an edge portion in a pixel block. Then, the pixel output order pattern selecting section 14g selects any of the plurality of second block dithers stored in the pixel output order pattern storage section 14f when the edge detecting section 14d does not detects any edge portions in a pixel block. Then, the image data generating section 14h generates the image data of a pixel block in order to output dots in conformity with the block dither selected by the pixel output order pattern selecting section 14g on the basis of the gradation value obtained by the gradation converting section 14c. Then, the error diffusion section 14i diffuses the errors before and after the quantization of the average value of the gradation values by the gradation converting section 14c to the surrounding pixel blocks of the pixel block subjected to the quantization processing. As a result, the speeding-up of image processing is enabled, and throughput is reduced. Moreover, the outputting of dots along an edge portion is enabled, and the improvement of the reproducibility of a high definition part, such as a thin line and a character, can be achieved even in a half tone. Moreover, a high definition and high gradation error diffusion image can be generated.

Moreover, according to a first embodiment, the pixel output order pattern selecting section 14g randomly selects any of a plurality of second block dithers when the edge detecting section 14d does not detect any edge portion in a pixel block. As a result, the processing suitable to the gradation reproduction generating no moiré patterns in non-edge portion that is not an edge portion becomes possible.

Moreover, according to the second embodiment, the blocking section 14a blocks multiple-valued image data by the predetermined plurality of pixels to create pixel blocks. Then, the edge detecting section 14d detects an edge portion in a pixel block on the basis of the gradation values of the respective pixels constituting the pixel block. Then, the dither pattern storage section 14k stores a plurality of dither patterns, each being a dither block having the same size as that of the pixel block and having threshold values determined correspondingly to each of the pixels of the pixel block. Then, the image block average value calculating section 14b calculates the average value of the gradation values of the pixels constituting the pixel block blocked by the blocking section 14a. Then, the gradation converting section 14c quantizes the average value of the gradation values calculated by the image block average value calculating section 14b on the basis of the previously determined quantization threshold values THR0-THR3. Then, the dither pattern selecting section 14m selects the first block dither having the same threshold values among the block dithers stored in the dither pattern storage section 14k when the edge detecting section 14d detects an edge portion in the pixel block. Then the dither pattern selecting section 14m selects a second block dither having different threshold values determined correspondingly to each of the pixels in the pixel block in order that the output order of dots may be predetermined orders among the block dithers stored in the dither pattern storage section 14k when the edge detecting section 14d does not detect any edge portion in the pixel block. Then, the image data generating section 14h quantizes the gradation values of the respective pixels in the pixel block blocked by the blocking section 14a in conformity with the first block dither selected by the dither pattern selecting section 14m when the edge detecting section 14d detects an edge portion in the pixel block, and the image data generating section 14h thereby generates the image data of the pixel block. Then, the image data generating section 14h generates the image data of the pixel block in order to output dots in conformity with the second block dither selected by the dither pattern selecting section 14m on the basis of the average value of the gradation values obtained by the gradation converting section 14c when the edge detecting section 14d does not detect any edge portion in the pixel block. Then, the error diffusion section 14i diffuses the errors before and after the quantization by the gradation converting section 14c and the image data generating section 14h to the surrounding pixel blocks of the pixel block subjected to the quantization processing. As a result, the speeding-up of image processing is enabled, and throughput is reduced. Moreover, the outputting of dots along an edge portion is enabled, and the improvement of the reproducibility of a high definition part, such as a thin line and a character, can be achieved even in a half tone. Moreover, a high definition and high gradation error diffusion image can be generated.

Moreover, according to the second embodiment, because the threshold values set in block dithers are made to be binarization threshold values, the conversions of gradation values can simply be performed, and the reproduction of high definition edges can be performed.

Moreover, according to the first and the second embodiments, the edge detecting section 14d detects an edge portion on the basis of a relation between the difference between the gradation value of a pixel having the maximum gradation value and the gradation value of a pixel having the minimum gradation value in a pixel block and the predetermined edge detecting threshold value THR4. As a result, the detection of an edge portion can be performed by means of a simple method.

Moreover, according to the first and the second embodiments, a pixel block is composed of n (n is a natural number) pixels. Then, the quantization threshold values THR0-THR3 are determined in order that the average value of the gradation values of the pixels constituting a pixel block after quantization by the gradation converting section 14c may be converted to (n+1) values. As a result, a high definition image adjusted to the reproducible gradations of a pixel block to be output can be generated.

Moreover, according to the first and the second embodiments, the attribute information judging section 14j inputs therein the attribute information indicating the attributes of the pixels constituting a pixel block to judge the attribute information. Then, the edge detecting section 14d detects an edge portion in a pixel block only when the attribute information that is character information is judged to be included in the pixel block as a result of the judgment by the attribute information judging section 14j. As a result, the reproducibility of a high definition part as an object of an edge portion in a character region can be improved.

Incidentally, the descriptions of the embodiments of the present invention are examples of the image processing apparatus according to the present invention, and the present invention is not limited to the embodiments. The configurations of details and the operations of details of each function section constituting the image processing apparatus can suitably be changed.

Moreover, although the present embodiment is configured to detect an edge portion on the basis of the relation between the difference between the maximum gradation value and the minimum gradation value and a predetermined threshold value, the detection of the edge portion may be performed by other methods. For example, the detection of an edge portion may be performed by judging that a foundation and a character adjoin to each other, that a foundation and an image adjoin to each other, or that a character and an image adjoin to each other, on the basis of attribute information.

Moreover, although the present embodiment is configured to randomly select a second block dither, the embodiment may be configured to select a second block dither in a predetermined order. In this case, it is preferable to consider lest a moiré or patterning should be generated.

Moreover, in the present embodiment, although an example using a hard disk, a semiconductor nonvolatile memory, or the like as a medium from which a program according to the present invention can be read by a computer has been disclosed, the present invention is not limited to this example. As another computer-readable medium, a portable recording medium such as a CD-ROM can be applied. Moreover, as a medium supplying the data of a program according to the present invention through a communication line, a carrier wave can also be applied.

The entire disclosure of Japanese Patent Application No. 2010-165714 filed on Jul. 23, 2010 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:
1. An image processing apparatus, comprising:
a blocking section to block multiple-valued image data by a predetermined plurality of pixels to create a pixel block;

an image block average value calculating section to calculate an average value of gradation values of pixels constituting the pixel block blocked by the blocking section;

a gradation converting section to quantize the average value of the gradation values calculated by the image block average value calculating section based on a previously determined quantization threshold value;

an edge detecting section to detect an edge portion in the pixel block based on the gradation values of the respective pixels constituting the pixel block;

a pixel output order pattern setting section to set a first pixel output order pattern of a size same as a size of the pixel block for outputting dots in a descending order of the gradation values based on the gradation values of the respective pixels constituting the pixel block;

a pixel output order pattern storage section to store a plurality of second pixel output order patterns, each being a pixel output order pattern of the same size as the size of the pixel block and including a previously determined output order of dots;

a pixel output order pattern selecting section to select the first pixel output order pattern set by the pixel output order pattern setting section when the edge detecting section detects the edge portion in the pixel block, the pixel output order pattern selecting section selecting any of the plurality of second pixel output order patterns stored in the pixel output order pattern storage section when the edge detecting section does not detect the edge portion in the pixel block;

an image data generating section to generate the image data of the pixel block in order that the dots may be output in conformity with the pixel output order pattern selected by the pixel output order pattern selecting section based on the gradation value obtained by the gradation converting section; and an error diffusion section to diffuse errors before and after the quantization of the average value of the gradation values by the gradation converting section to surrounding pixel blocks of the pixel block subjected to the quantization processing.

2. The image processing apparatus according to claim 1, wherein the pixel output order pattern selecting section randomly selects any one of the plurality of second pixel output order patterns when the edge detecting section does not detect any edge portion in the pixel block.

3. The image processing apparatus according to claim 1, wherein the edge detecting section detects the edge portion based on a relation between a difference between a gradation value of a pixel having a maximum gradation value in the pixel block and a gradation value of a pixel having a minimum gradation value in the pixel block and a predetermined edge detecting threshold value.

4. The image processing apparatus according to claim 1, wherein the pixel block is composed of n (n is a natural number) pixels; and the quantization threshold value is determined in order that the average value of the gradation values of the pixels constituting the pixel block after the quantization by the gradation converting section may be converted to be in (n+1) values.

5. The image processing apparatus according to claim 1, further comprising an attribute information judging section to input therein pieces of attribute information indicating attributes of the pixels constituting the pixel block to judge the pieces of attribute information, wherein the edge detecting section detects the edge portion in the pixel block only when the attribute information judging section judges that the pieces of attribute information indicating a character attribute are included in the pixel block.

6. An image processing method, comprising the steps of:

blocking multiple-valued image data by a predetermined plurality of pixels to create a pixel block;

calculating an average value of gradation values of pixels constituting the pixel block blocked at the step of blocking;

quantizing the average value of the gradation values calculated at the step of calculating based on a previously determined quantization threshold value;

detecting an edge portion of the pixel block based on the gradation values of the respective pixels constituting the pixel block;

setting a first pixel output order pattern of a size same as that of the pixel block for outputting dots in a descending order of the gradation values based on the gradation values of the respective pixels constituting the pixel block;

selecting the first pixel output order pattern set at the step of setting when the edge portion in the pixel block is detected at the step of detecting, and selecting any of the plurality of second pixel output order patterns stored in a pixel output order pattern storage section, the second pixel output order patterns each having a size same as that of the pixel block and a previously determined output order of dots, when the edge portion is not detected in the pixel block at the step of detecting;

generating the image data of the pixel block in order that the dots may be output in conformity with the pixel output order pattern selected at the step of selecting based on the gradation value obtained at the step of quantizing; and diffusing errors before and after the quantization of the average value of the gradation values at the step of quantizing to surrounding pixel blocks of the pixel block subjected to the quantization processing.

* * * * *